United States Patent [19]

Carnicle

[11] 4,095,964
[45] Jun. 20, 1978

[54] SCRUBBER TOWER

[76] Inventor: Francis Earl Carnicle, 600 Rte. 10, Whippany, N.J. 07981

[21] Appl. No.: 727,495

[22] Filed: Sep. 28, 1976

[51] Int. Cl.² .......................................... B01D 47/12
[52] U.S. Cl. .................................. 55/241; 55/261; 55/267; 55/435; 261/17; 261/111
[58] Field of Search ................. 55/220, 222, 241, 242, 55/267, 385 D, 435, 90, 469, 261; 261/17, 111, 126, 161, DIG. 9, 127, 136

[56] References Cited

U.S. PATENT DOCUMENTS

| | | | |
|---|---|---|---|
| 640,796 | 1/1900 | Neuhs | 55/222 |
| 803,139 | 10/1905 | Sinn et al. | 261/111 |
| 1,508,367 | 9/1924 | Matlock | 55/261 |
| 1,715,253 | 5/1929 | Sperr, Jr. | 261/111 |

FOREIGN PATENT DOCUMENTS

| | | | |
|---|---|---|---|
| 2,215,931 | 10/1973 | Germany | 55/261 |
| 289,118 | 4/1928 | United Kingdom | 261/111 |

Primary Examiner—William A. Cuchlinski, Jr.
Assistant Examiner—David L. Lacey
Attorney, Agent, or Firm—H. Hume Mathews

[57] ABSTRACT

An improved scrubber tower is provided for removing pollutants from hot, corrosive off-gases from chemical processes, such as processes for the production of titanium dioxide pigments. The tower is formed from wood strip baffles treated with fire resistant chemicals arranged in alternate layers extending perpendicularly to each other and secured with titanium fasteners and enclosed in fiber glass walls, the flow passages through the tower being of large cross sectional area relative to the cubic feet of off-gas scrubbed per unit of time as to maintain a relatively low off-gas velocity upwardly through the tower, substantially the same as the velocity that would be present under natural draft conditions, and at low pressures, only slightly above ambient air pressure.

3 Claims, 11 Drawing Figures

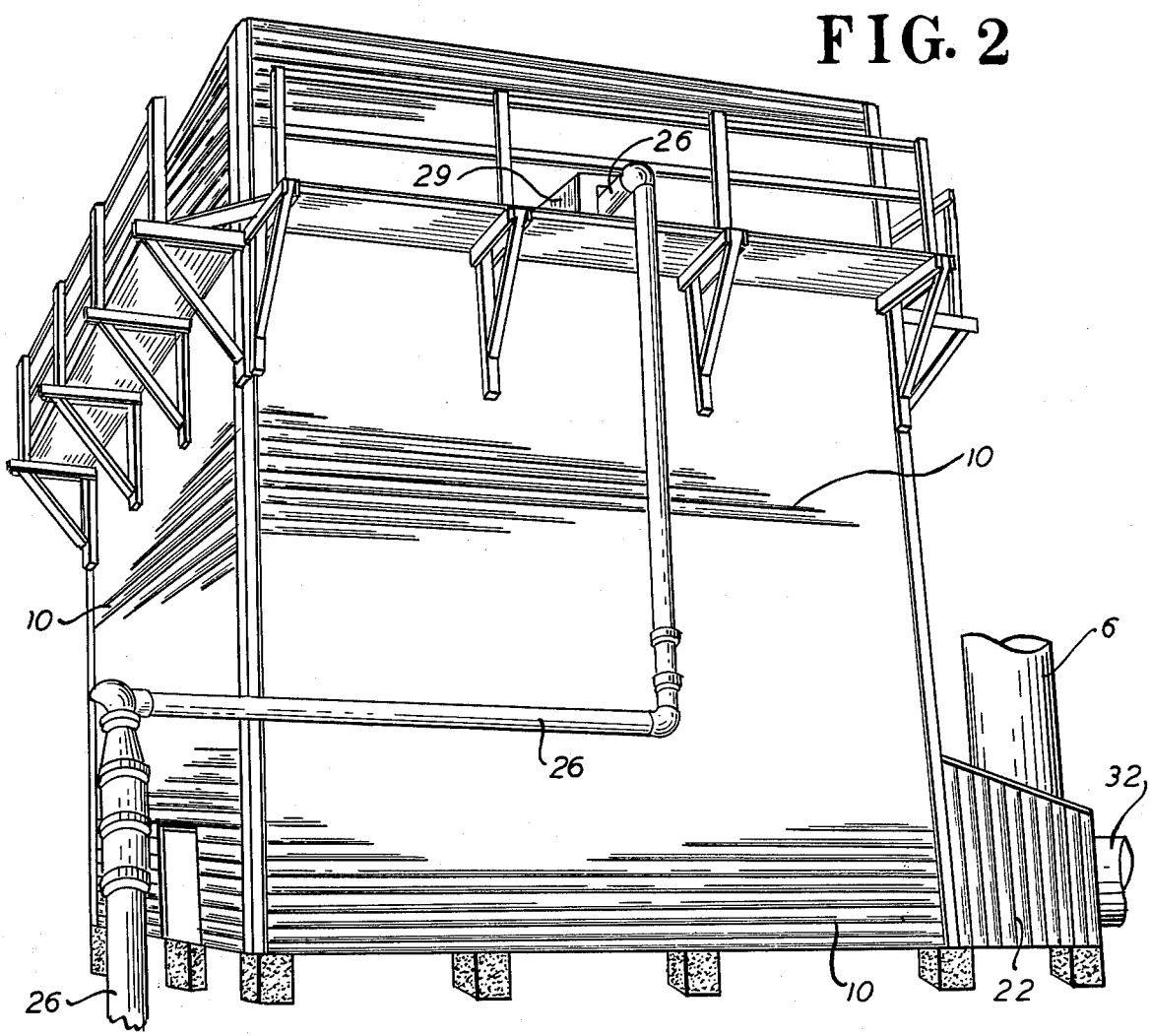
FIG. 2
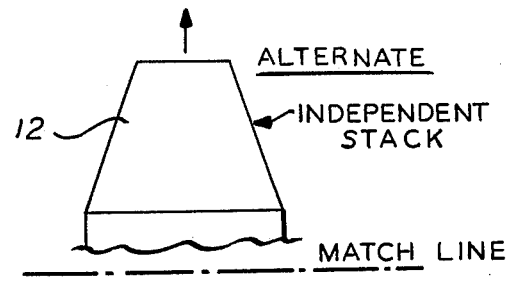
FIG. 1
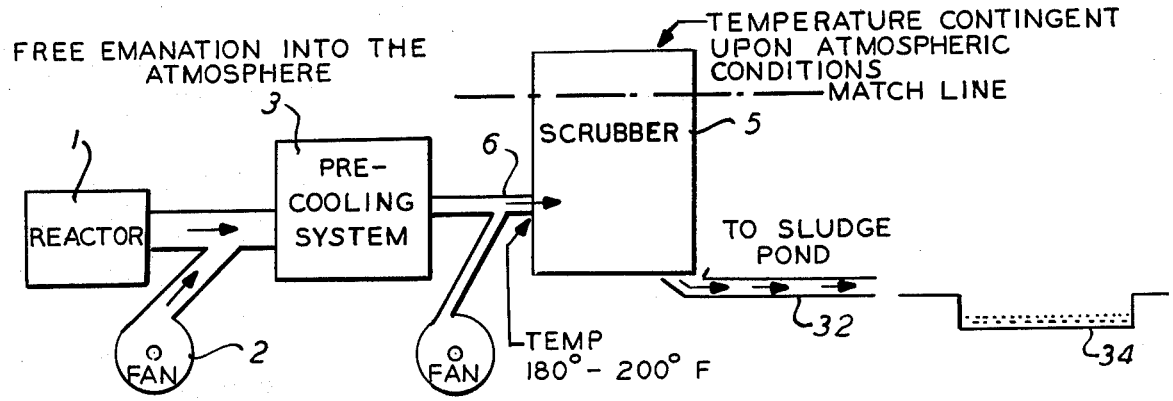

FIG. 8
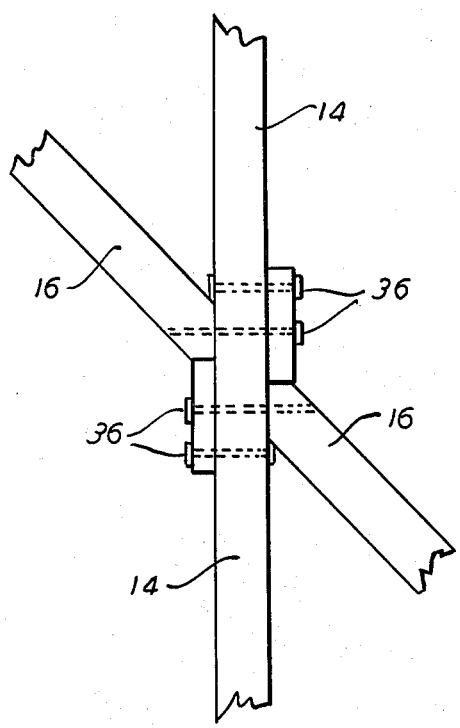
FIG. 9
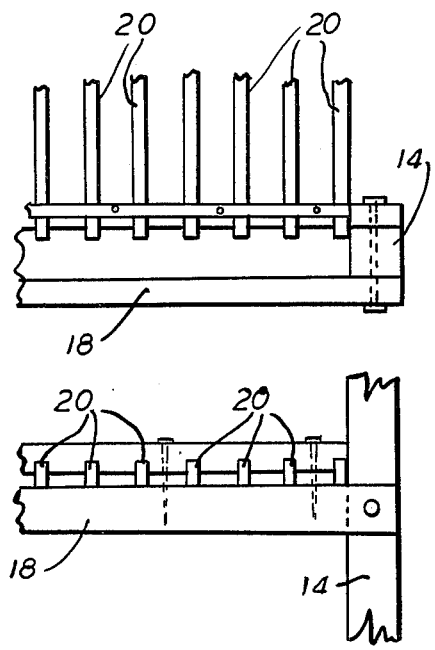
FIG. 10
FIG. 11
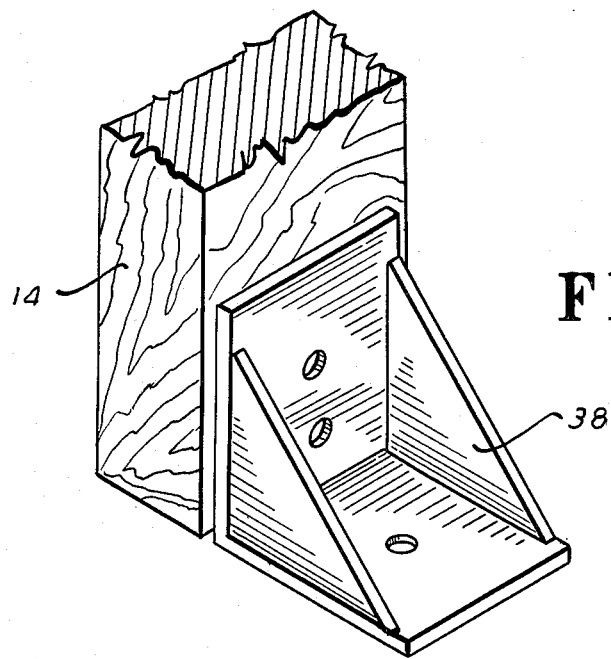

SCRUBBER TOWER

BACKGROUND OF INVENTION

Scrubbers of many different types are well known for separating solids and liquids from a gas stream. Some types of scrubbers operate very effectively, and there are types of scrubbers available for removing almost any type of pollutant from an off-gas. However, the cost of scrubbers in general is quite high in relation to capacity and this is particularly true in the case of scrubbers suitable for treatment of corrosive materials. The present invention provides a scrubber that operates effectively and efficiently to separate solid and liquid pollutants from hot, highly corrosive off-gases by a structure which is low in capital cost, which has low operating costs, and has a long, maintenance free, useful life.

BRIED DESCRIPTION OF THE DRAWINGS

FIG. 1 is a schematic view showing a scrubbing system constructed according to the present invention for removing pollutants from the hot corrosive off-gas from a chemical process for the manufacture of titanium pigments.

FIG. 2 is a perspective view of the scrubbing tower of the system shown in FIG. 1.

FIGS. 8, 9, 10 and 11 are detailed views showing the manner in which the treated wood frame members and baffle strips are secured by titanium fasteners.

DETAILED DESCRIPTION OF THE PREFERRED EMBODIMENT

Figure 3:
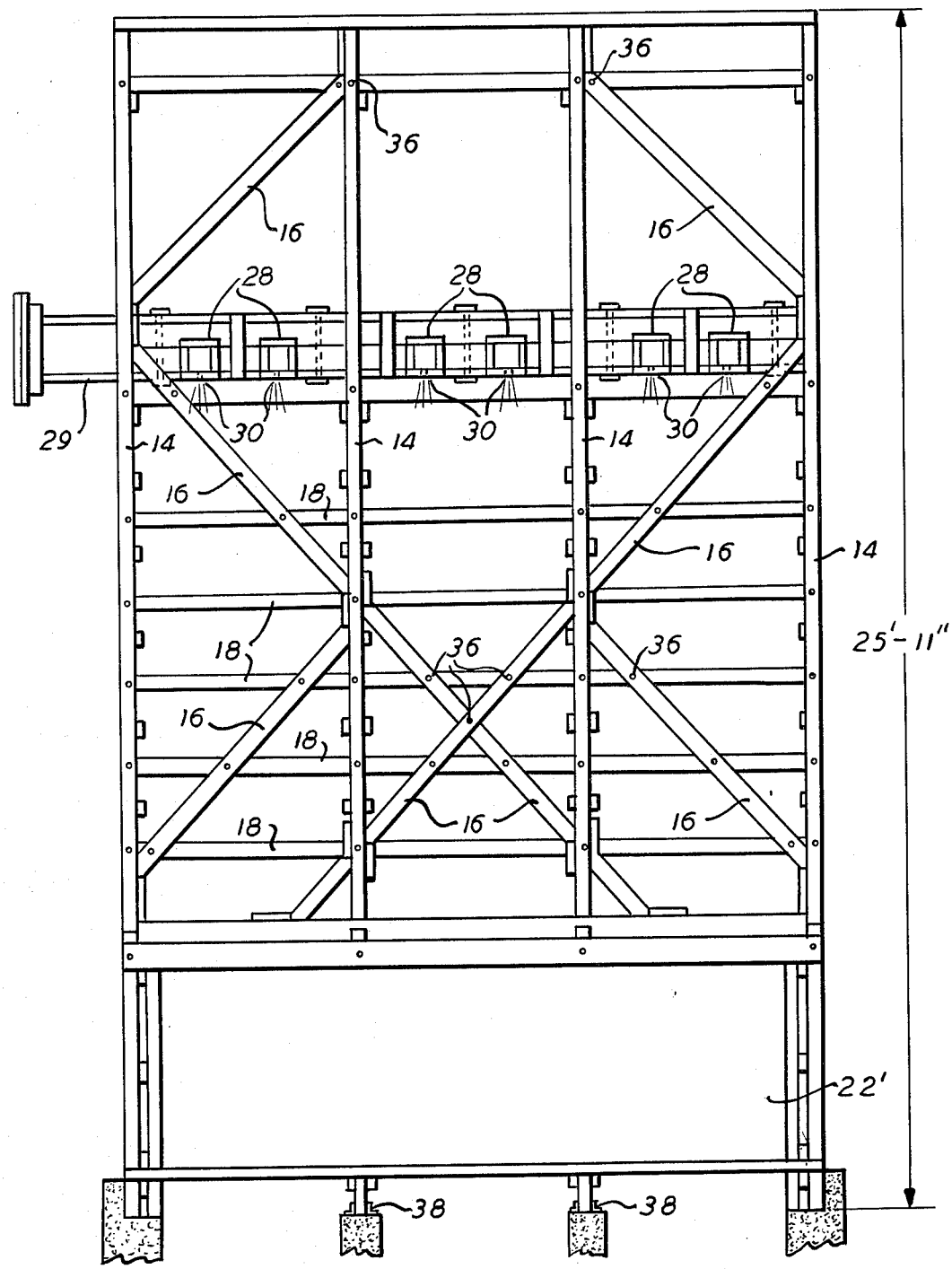
FIG. 3 is a right side elevation, drawn to scale, of the tower of FIG. 2 but with the fiber glass walls omitted to show the interior tower framework.

The improved scrubber system of this invention, shown in FIG. 1, acts to remove pollutants from a hot, corrosive, polluted off-gas emanating from a chemical reactor boiler, or kiln, 1 in this case a reactor for the manufacture of titanium pigments. Flow of the polluted off-gas from the reactor 1 to the scrubber tower 5 is assisted by a fan 2 which pumps a stream of fresh (i.e. ambient) air into the off-gas duct 6 (made of fiberglass) in the direction of flow of the polluted off-gas, and thereby assists its movement into and through a pre-cooling system 3, which consists of a mixing chamber wherein the polluted off-gas is cooled by mixing with the cool atmospheric air to temperatures within the range from about 180° to about 200° F. The precooling system need be used, of course, only when the hot off-gas emanating from the reactor is at a temperature in excess of 200° F. For extremely hot off-gas, a second fan, as shown in FIG. 1, may be provided further to introduce additional fresh air into the off-gas downstream of the precooler, and before the off-gas enters tower 5. Either or both fans may be controlled, so that the amount of cooling air added to the off-gas is sufficient to maintain the temperature of the mixed off-gas/fresh air mixture entering tower 5 in the range from 180°–200° F.

The focal point of the system is the improved scrubber tower 5, into the bottom of which the polluted off-gas from reactor 1 is fed through duct 6, as shown in FIGS. 1 and 2.

As shown in perspective in FIG. 2, the tower is encased on the four sides by twelve-ounce fire retardant sheets of fiberglass, two of which are shown at 10. The top may be left open, as in FIG. 2, or it may be provided with a stack 12 as shown as an alternate in FIG. 1.

Figure 4:
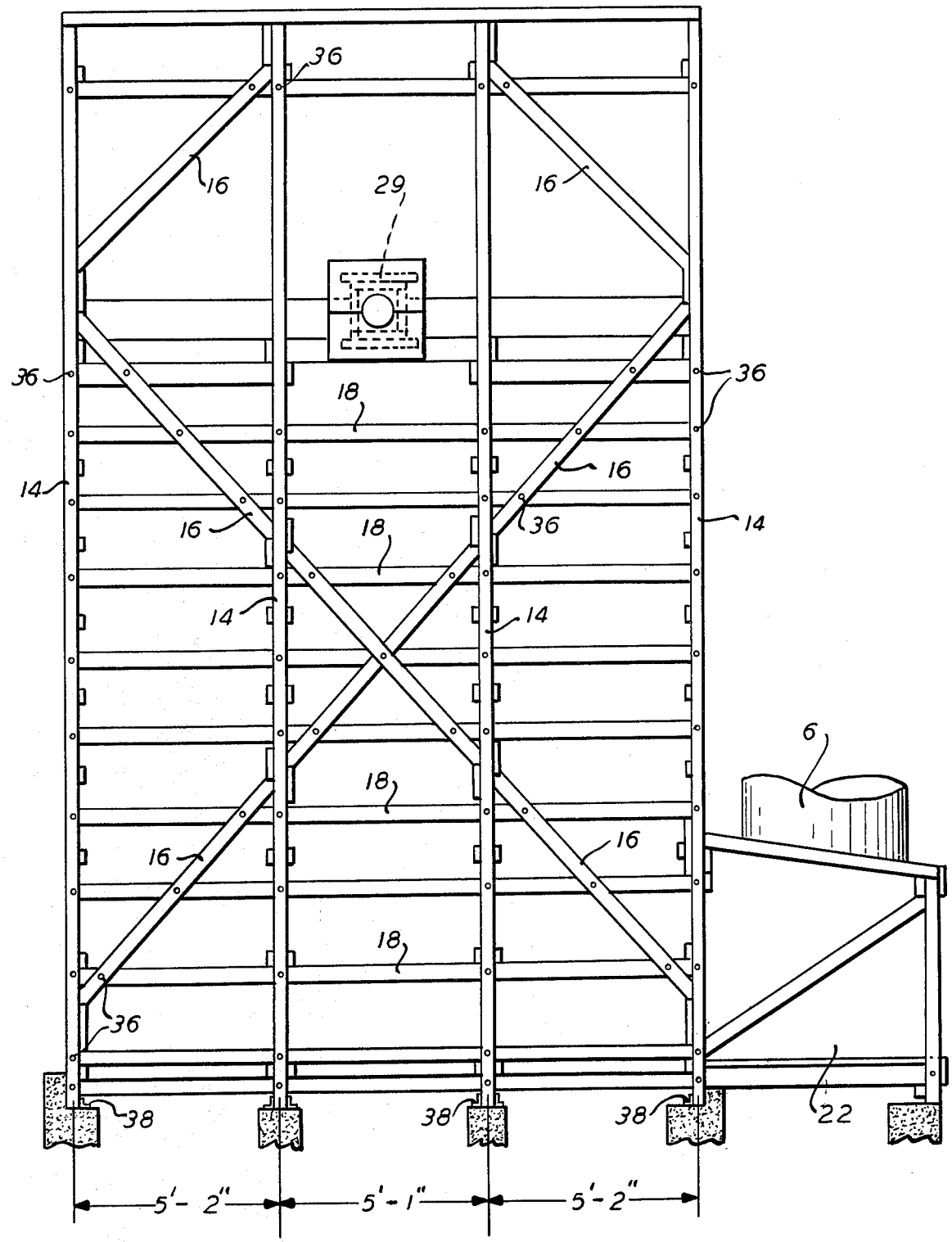
FIG. 4 is a front elevational view, like FIG. 3.
Figure 5:
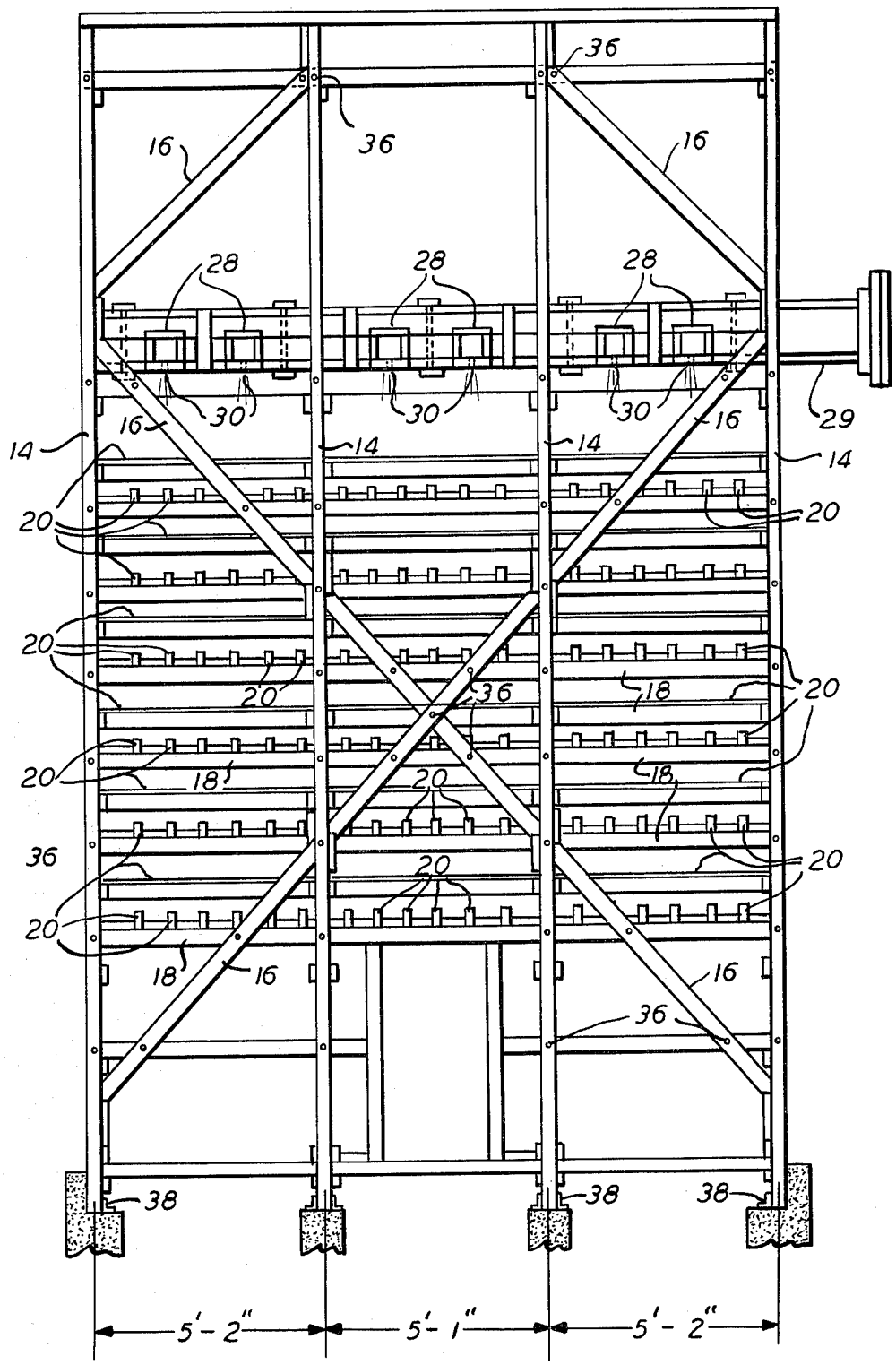
FIG. 5 is a left elevation, like FIG. 3 but showing in addition to he tower framework the perpendicularly arranged baffle strips that are wet by the wash water from the overhead sprays and which act to remove pollutants from the off-gas rising through the tower.
Figure 6:
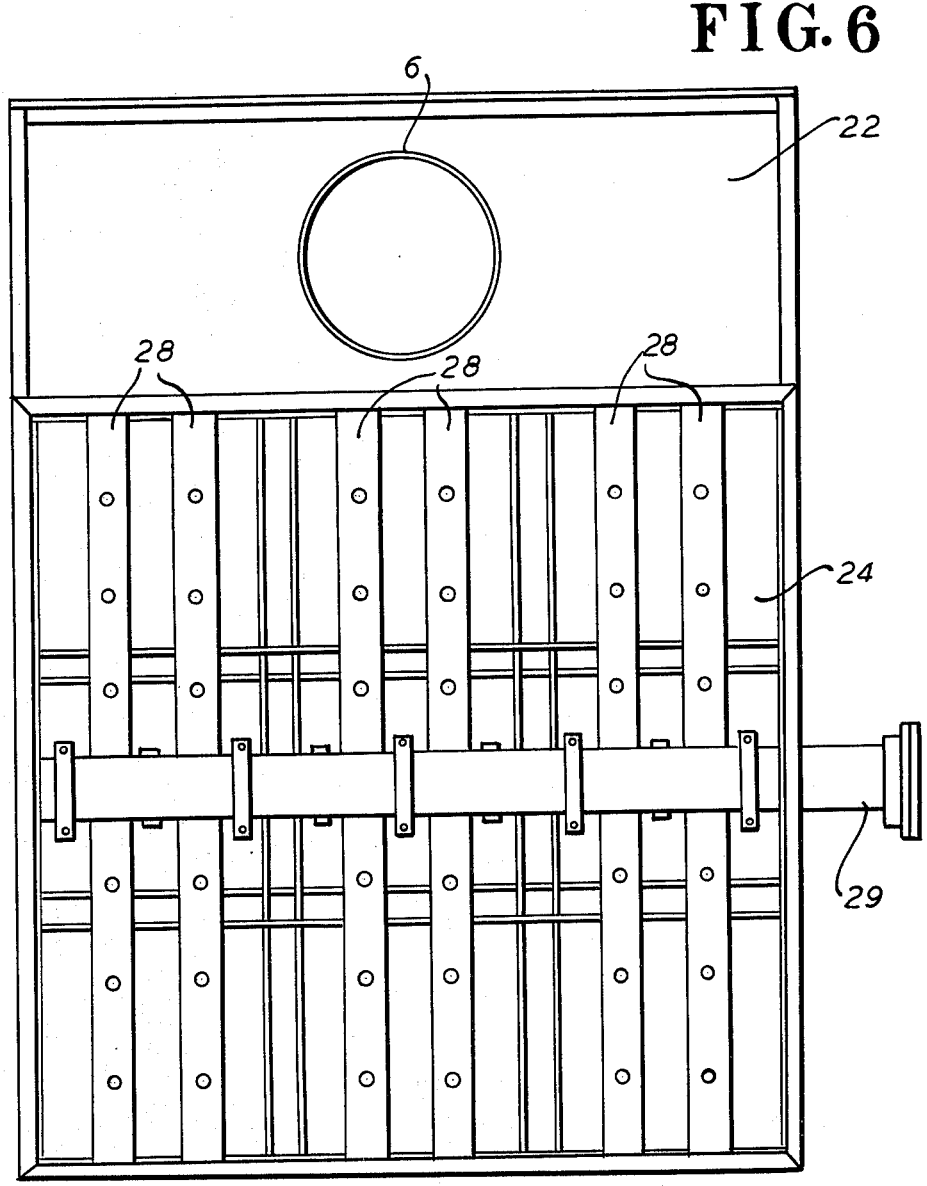
FIG. 6 is a top view, like FIG. 3.
Figure 7:
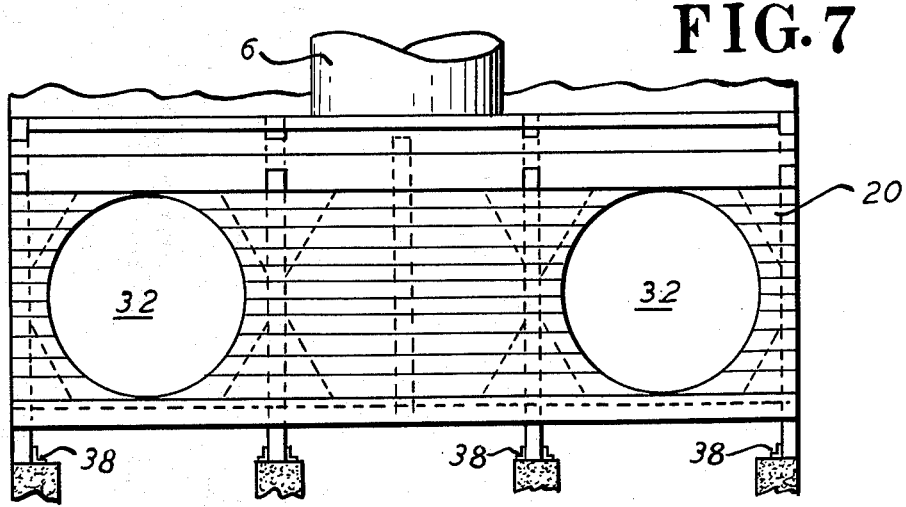
FIG. 7 is a fragmentary side view of the off-gas ducts which introduce the hot, corrosive off-gases into the plenum chamber at the bottom of the tower.

The tower frame, to which the fiberglass cover sheets are secured is shown in FIGS. 3, 4 and 5. The frame comprises posts 14 and bracings 16 of 4 inch × 4 inch fire retardant Douglas fir lumber. Ties and cross braces 18 are 2 inch × 4 inch and 2 inch × 6 inch fire retardant Douglas fir. The baffle strips 20 (FIG. 5) are made of 1 inch × 2 inch slats of fire retardant (i.e. treated) Douglas fir.

The polluted off-gas, after having been cooled by the pre-cooler 3 to the 180°–200° F range, flows into a plenum chamber 22 at the bottom of tower 10 through duct 6. From the plenum chamber 22 the polluted off-gas passes into the open space at the bottom of the tower underneath baffles 20 FIG. 5) and then rises upwardly through the tower and over the baffle strips 20 and exits into the ambient atmosphere through the open top 24 of the tower or, in an alternative arrangement, through a stack 12 which is connected to the open top 24.

Baffles 20 are arranged in horizontally extending beds, each composed of a series of parallel slats 20 as shown in FIG. 5, with the slats in each bed extending perpendicularly to the slats in each of the adjacent beds. Thus, if the slats of any particular bed had their longitudinal axes extending east-west, for example, the slats of the bed immediately below and the slats of the bed immediately above would be arranged so that their longitudinal axes would extend north-south. The resulting criss-cross of many baffles results in a tortuous maze, of large surface area, through which the polluted off gas rises in turbulent flow. Practically all the solid or liquid particles of pollutant, with which the off gas is contaminated, contacts one or more surfaces of the slats as the polluted off gas rises through the tower from the plenum chamber to the top exit opening.

In order to entrap the solid and liquid pollutants in the off gas, cause them to adhere to the baffle surfaces which they impact, and eventually wash said particles down into a drain system at the bottom of the tower wash water is brought into the tower through a water pipe 26 (FIG. 2) into a four-sided header 29 made of 2 inch × 10 inch tongue and groove treated boards, from which it flows into wooden ducts 28 (FIG. 3) which are 4 inches × 4 inches and are made of treated Douglas fir. The ducts 28 extend horizontally across the inside of the tower, at the top thereof, and have in their bottom sides nozzles 30 made of polypropylene reinforced with 25% by weight fiberglass.

Wash water is sprayed downwardly from nozzles 30, preferably in the form of a mist or very fine spray, so that droplets of water flow downwardly through the tower continuously during operation thereof, wetting all the surfaces of the baffles and entrapping the solid and liquid pollutants which contaminate the off-gas. Further, the downwardly flowing wash water washes away the pollutants which collect on the baffle surfaces and carries them into the sump space 22' at the bottom of the tower, from which they flow, with the used wash water, through a pipe 32 (FIG. 1) to a sludge pond 34. Water from the sump space or from the sludge pond may be screened or filtered and then recycled back to the ducts 28 if desired.

All wood pieces within the tower, including particularly the baffles 20, are made of Douglas fir treated with fire retardant chemicals so as to withstand the temperatures of the polluted off-gases passing through the tower. Any known commercial fire-retardant treatment for treating the wood pieces to make them resistant to combustion can be used, so long as the treated pieces will withstand the maximum temperature of about 230° F to be encountered. The preferred treatment, available commercially, is known as the N.C.X treated wood, fire retardant and Underwriters Laboratory approved. Such treated wood is available from Koppers Chemical Co., Timbers Division, Oreville, California.

The fasteners used for securing the wood pieces within the tower are preferably titanium, used in the bolts and brackets 36, 38 as shown in FIG. 8 and FIG. 11, respectively. Titanium has been found successfully to resist the corrosion that otherwise would occur as a result of the highly corrosive properties of the off gas passing through the tower.

The scrubber system and tower of the present invention is particularly adapted for the scrubbing, and removal of solid and liquid pollutants, from reactor off-gas, such as the off-gas from a chemical reactor for the manufacture of titanium dioxide pigments, which off-gas contains highly corrosive substances such as sulphuric acid, titanium oxides, flyash, limeash, and titanium pigments.

The tower is so constructed and sized (FIGS. 3 through 11 are drawn to scale) and the "boost" to the flow provided by the fans 2 and 3 is so regulated that the flow of off-gas through the tower is substantially at the same pressure (only slightly higher than the ambient atmospheric pressure) that would result from the natural draft occurring from the tendency of the hot off-gas to rise, relative to the ambient air. The regulated temperature of the off-gas entering the tower (180°–200° F) is sufficient to move the polluted gas through the tower by natural draft, at low velocity and low pressure but high volume, and out the open top of the tower. The volume of the off-gas passing through the tower is quite high, being in the order of magnitude of 42,000 cubic feet per minute for a tower of the dimensions shown in the drawing. Thus, the tower is one that operates at relatively high volume at relatively low pressure, as compared to prior towers presently in commercial use which operate at low volumes and high pressure. The tower of the present invention utilizes large cross-sectional flow areas, so that the off-gas can flow in large quantity at substantially its "natural rate", without much, if any, acceleration by fans, whereas in the towers of the commercial prior art relatively small volumes of off-gas are accelerated to relatively high velocities by pumps or fans so that the off-gas flows through the tower at relatively high velocities at relatively high pressures.

I claim:

1. Apparatus for scrubbing pollutants from an extremely hot, highly corrosive off-gas from a reactor chamber comprising, a scrubber tower comprising stacked baffles arranged in levels with the baffles in each level extending parallel to each other and perpendicular to the baffles in the adjacent levels, said baffles being composed of fire retardant treated wood which can withstand a temperature up to at least 230° F to provide non-combustible, corrosion resistant impact members on the surfaces of which off-gas passing through the scrubber impinge for the entrapment of pollutant particles and the removal thereof from the off-gas stream, a plenum chamber at the bottom of said tower, means connecting said reactor chamber to said plenum chamber and means connected between said reactor chamber and the plenum chamber for cooling said off-gas prior to its entry into said plenum chamber to a temperature below 230° F, means at the top of said scrubber for dispersing water downwardly into said scrubber in a mist of fine droplets so that the impingement surfaces of said baffles are kept continuously coated with a continuous downwardly flowing water stream, and means for exhausting scrubbed gas, substantially free of pollutants, from the top of said scrubber into the ambient air.

2. Apparatus according to claim 1 in which the reactor chamber comprises means which emits off-gas containing titanium oxides and the tower framework and the baffles are constructed of fire retardant treated wood secured by titanium fasteners, the framework and baffles being enclosed by fiberglass sheets so that substantially the only materials contacted by the off-gas are either fire retardant treated wood, fiberglass, or titanium.

3. Apparatus according to claim 1 in which the means connecting said reactor chamber to said plenum chamber includes at least one fan means for pumping a stream of fresh cooling air into said off-gas stream.

* * * * *